United States Patent [19]

Kurokawa et al.

[11] Patent Number: 5,398,281
[45] Date of Patent: Mar. 14, 1995

[54] TELEPHONE WITH HANDS-FREE OPERATION

[75] Inventors: Osamu Kurokawa, Tokyo; Buntaro Sawa, Kanagawa; Takuya Kanazumi, Tokyo, all of Japan

[73] Assignee: Kabushiki Kaisha Toshiba, Kanagawa, Japan

[21] Appl. No.: 871,978

[22] Filed: Apr. 22, 1992

[30] Foreign Application Priority Data

Apr. 23, 1991 [JP] Japan ................................. 3-092351

[51] Int. Cl.$^6$ ........................................... H04M 9/08
[52] U.S. Cl. .................................. 379/390; 379/388; 379/402; 379/410; 379/406
[58] Field of Search ............... 379/390, 388, 402, 406, 379/407, 410

[56] References Cited

U.S. PATENT DOCUMENTS

| | | | |
|---|---|---|---|
| 4,241,236 | 12/1980 | Nash | 455/296 |
| 4,629,829 | 12/1986 | Puhl et al. | 379/58 |
| 4,715,063 | 12/1987 | Haddad et al. | 379/390 |
| 4,731,832 | 3/1988 | Brossaud | 379/388 |
| 4,819,263 | 4/1989 | Franklin | 379/388 |
| 4,843,621 | 6/1989 | Portratz | 379/390 |
| 4,982,425 | 1/1991 | Yoshida | 379/390 |
| 5,212,722 | 5/1993 | Murata | 379/390 |

Primary Examiner—James L. Dwyer
Assistant Examiner—J. M. Saint-Surin
Attorney, Agent, or Firm—Finnegan, Henderson, Farabow, Garrett & Dunner

[57] ABSTRACT

A hands-free circuit includes a transmit noise level detector which detects a transmit noise level and a first comparator which compares the transmit noise level with a reference level. If the transmit noise level is higher than the reference level, the first comparator provides a control signal indicating a noisy state has been detected. In response to the control signal, a transmit audio level is attenuated. Further the attenuated transmit audio level is compared with a receive audio level by a second comparator which provides an output signal indicating either a transmit-mode or a receive-mode. In response to the output of the second comparator, one audio signal is attenuated.

18 Claims, 7 Drawing Sheets

|  | TRANSMIT NOISE LEVEL | RECEIVE AUDIO LEVEL | TRANSMIT VOICE LEVEL | OUTPUT OF COMPARATOR 202 | ATT 206 | OUTPUT OF COMPARATOR 109 | MODE |
|---|---|---|---|---|---|---|---|
| A1 | L | H | L | 0 | 0 | 0 | Rx |
| A2 | H | H | L | 1 | 1 | 0 | Rx |
| B1 | L | L | H | 0 | 0 | 1 | Tx |
| B2 | H | L | H | 1 | 1 | 1 | Tx |
| B3 | H | H | L | 1 | 1 | 0 | Rx |

TELEPHONE WITH HANDS-FREE OPERATION

BACKGROUND OF THE INVENTION

1. Field of the Invention

The present invention relates generally to telephones with hands-free operation and more particularly to an improved hands-free circuit of a radio or landline telephone which may be utilized in noisy environments.

2. Description of the Related Art

In a radio telephone system, a user communicates with another user by means of a telephone handset. In operation one hand of the user has to be used to hold the handset. Therefore only the other hand of the user is free to drive additional vehicle. In order to provide a freedom for the user, hands-free circuits have been developed for the radio telephone.

Figure 1:
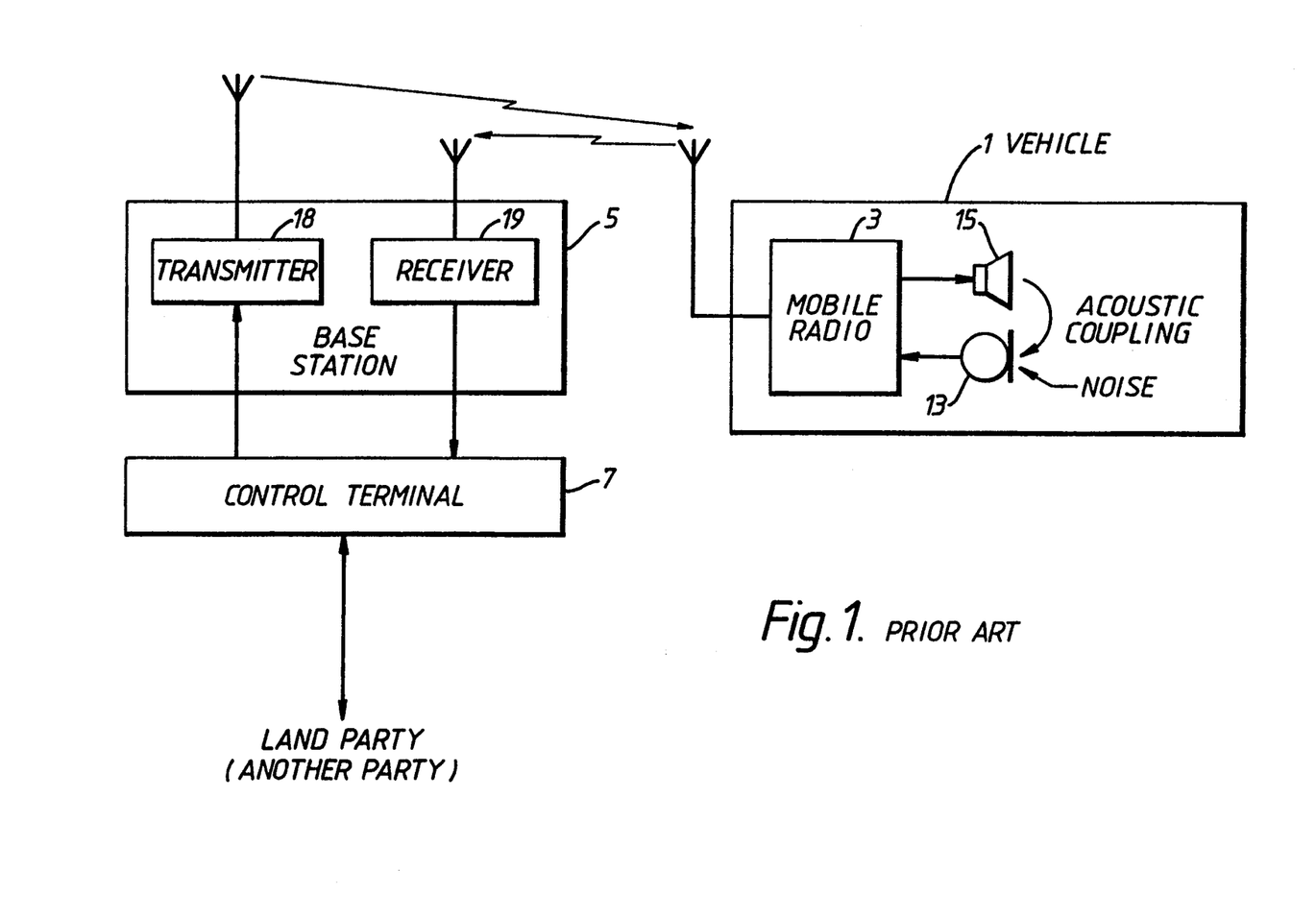
FIG. 1 is a block diagram of a mobile radio telephone and a radio system.

A basic mobile radio telephone system is shown in FIG. 1. In the conventional radio telephone systems, a mobile party in a vehicle 1 communicates with a radio base station 5 using a mobile radio 3. The base station 5 communicates with a land party (another user) using a radio system control terminal 7.

In the conventional radio telephone, an acoustic coupling from a speaker 15 to a microphone 13 may occur. Further the audio signal from the microphone 13 may be reflected in the mobile radio 3. Therefore a loop from the speaker 15 to the microphone 13, the mobile radio 3 and the speaker 15 is generated. If the amplification gain of the loop is great, a howling occurs in the speaker 15.

Figure 2:
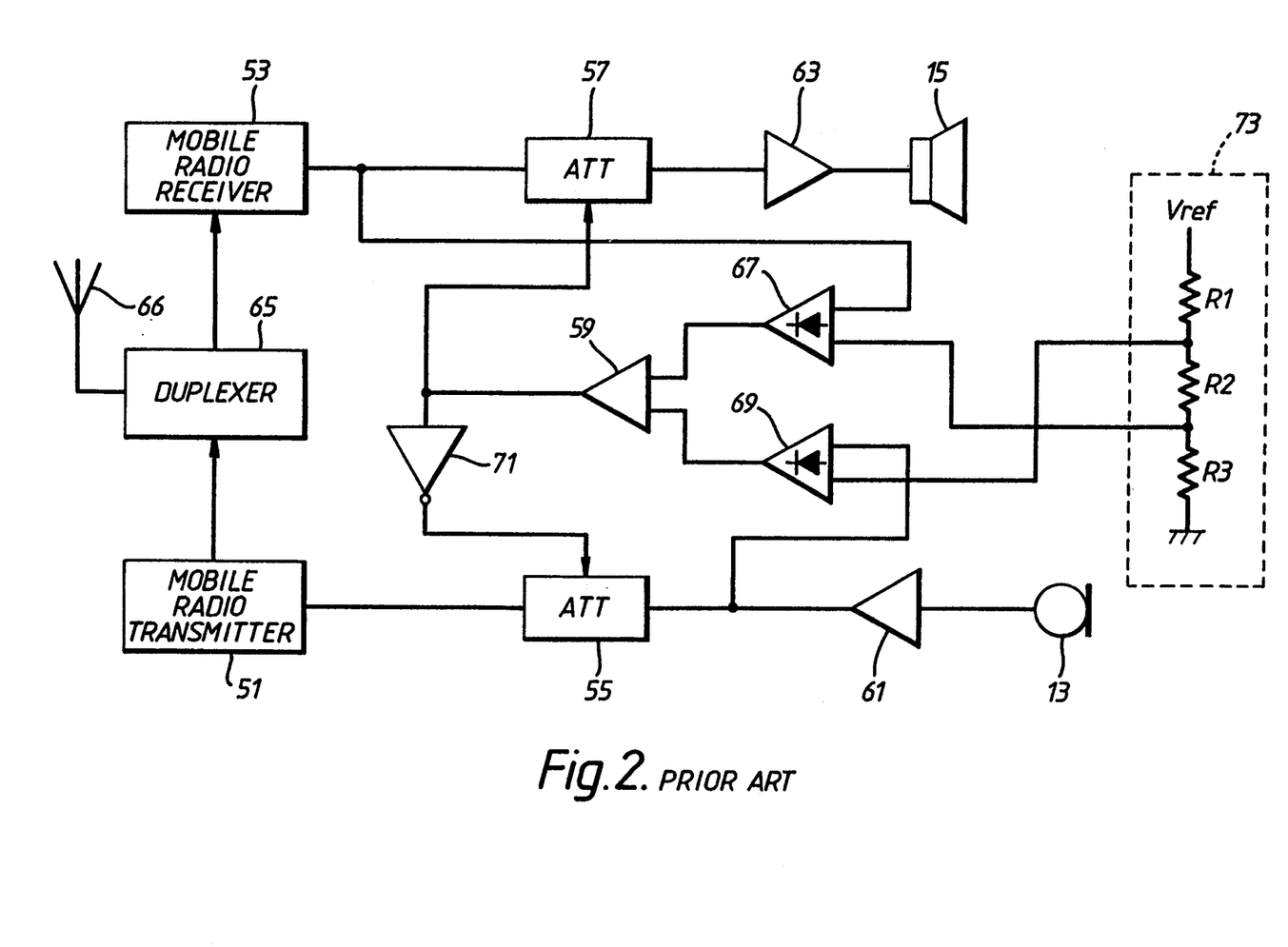
FIG. 2 is a block diagram of a conventional hands-free circuitry.

Referring to FIG. 2, there is illustrated a block diagram of a conventional hands-free control circuit which has been used for avoiding the howling. The control circuit of FIG. 2 is provided in the mobile radio 3.

The control circuit interfaces a microphone 13 and a speaker 15 to a mobile radio transmitter 51 and a mobile radio receiver 53, respectively. A path from the microphone 13 to a mobile radio transmitter 51 is defined as a microphone audio path. A path from a mobile radio receiver 53 to the speaker 15 is defined as a speaker audio path. In the microphone audio path, an amplifier 61 and an attenuator 55 are provided. In the speaker audio path, an attenuator 57 and an amplifier 63 are provided.

The audio signal from the attenuator 55 is applied to the mobile radio transmitter 51. The mobile radio transmitter 51 generates a radio signal from the audio signal. The radio signal is transmitted to the base station via duplexer 65 and an antenna 66. A radio signal transmitted from the base station 5 is received through by the antenna 66, the duplexer 65 and the mobile radio receiver 53. The mobile radio receiver 53 demodulates an audio signal from the radio signal. The audio signal from the mobile radio receiver 53 is applied to the attenuator 57 and a recieve signal level detector 67. The recieve signal level detector 67 detects a level of the audio signal from the mobile radio receiver 53.

The audio signal generated by the amplifier 61 in the microphone audio path is applied to the attenuator 55 and a transmit signal level detector 69. The transmit signal level detector 69 detects a level of the audio signal from the amplifier 61.

A comparator 59 provides a binary one state if the output level of the transmit audio signal level detector 69 is higher than the output level of the receive audio signal level detector 67. This state is defined as a transmit-mode. The binary one state from the comparator 59 is applied to the attenuator 57 and an inverting gate 71. Therefore the attenuator 57 is activated for attenuating the audio signal from the mobile radio receiver 53. The attenuator 55 is not activated due to the inverting gate 71.

The comparator 59 provide a binary zero state if the output level of the receive audio signal level detector 67 is higher than the output level of the transmitt audio signal level detector 69. This state is defined as a receive-mode. The binary zero state from the comparator 59 is applied to the attenuator 57 and the inverting gate 71. Therefore the attenuator 55 is activated for attenuating the audio signal from the amplifier 61. The attenuator 57 is not activated due to the inverting gate 71.

Thus since the amplification gain of the loop from the speaker 15 to the microphone 13, the mobile radio transmitter 51, the mobile radio receiver 53 and the speaker 15 is decreased by the attenuators 55 or 57, the howling is avoided.

Further, bias voltages are applied to the transmit audio signal level detector 69 and to the receive audio signal level detector 67 by an offset voltage circuitry 73, such that the bias voltage to the transmit audio signal level detector 69 is higher than the bias voltage to the receive audio signal detector 67. When there is no input to the microphone 3 and no audio signal from the mobile radio receiver 53, therefore, the comparator 59 provides a binary one state.

In the conventional circuit, however, the comparator 59 provides the output by comparing the levels detected by the transmit audio signal level detector 69 and the receive audio signal level detector 67. Therefore, when the ambient noise occurs in a vehicle, the output level of the transmit audio signal level detector 69 is higher than the output level of the receive audio signal level detector 67. That is, although a receive audio signal from the mobile radio receiver 53 is greater than a voice signal from the microphone 13, the ouput level of the transmit signal level detector 69 is made greater than the ouput level of the detector 67 due to a noise signal from the amplifier 61 to the detector 69. Therefore when the noise starts occuring, the ouput of the comparator 59 changes to the binary one state from the binary zero state. As a result, the comparator 59 activates the attenuator 57 to attenuate the receive audio signal from the mobile radio receiver 53.

That is, although another user speaks, the receive audio signal is caused to be small. Therefore the mobile party has difficulty in listening to another user's speech via the speaker 15.

Further, although another user's speech starts and the level of the ambient noise around the mobile party is much greater than the level of the receive audio signal, there is no change from the transmit mode to the receive mode. Therefore the mobile party has difficulty in listening to another user's speech.

SUMMARY OF THE INVENTION

Accordingly, it is an object of the present invention to provide a telephone with hands-free operation capable of reducing the effect of noise.

It is further object of the present invention to provide a telephone with hands-free operation wherein the receive-mode may be appropriately maintained even in a noisy environment.

It is another object of the present invention to provide a telephone with hands-free operation wherein the mode may be changed from the transmit-mode to the receive-mode when the mobile party ceases to speak in noisy environment and the land party starts conversation.

These and other objects are achieved in the present invention including a hands-free circuit.

The hands-free circuit includes a transmit noise level detector which detects a transmit noise level and a first comparator which compares the transmit noise level with a reference level. If the transmit noise level is higher than the reference level, the first comparator provides a control signal indicating that noisy state has been detected. In response to the control signal, a transmit audio level is attenuated. Further the attenuated transmit audio level is compared with a receive audio level by a second comparator which provides an output signal indicating either a transmit-mode or a receive-mode. In response to the output of the second comparator, one audio signal is attenuated.

DETAILED DESCRIPTION OF THE PREFERRED EMBODIMENT

Figure 3:
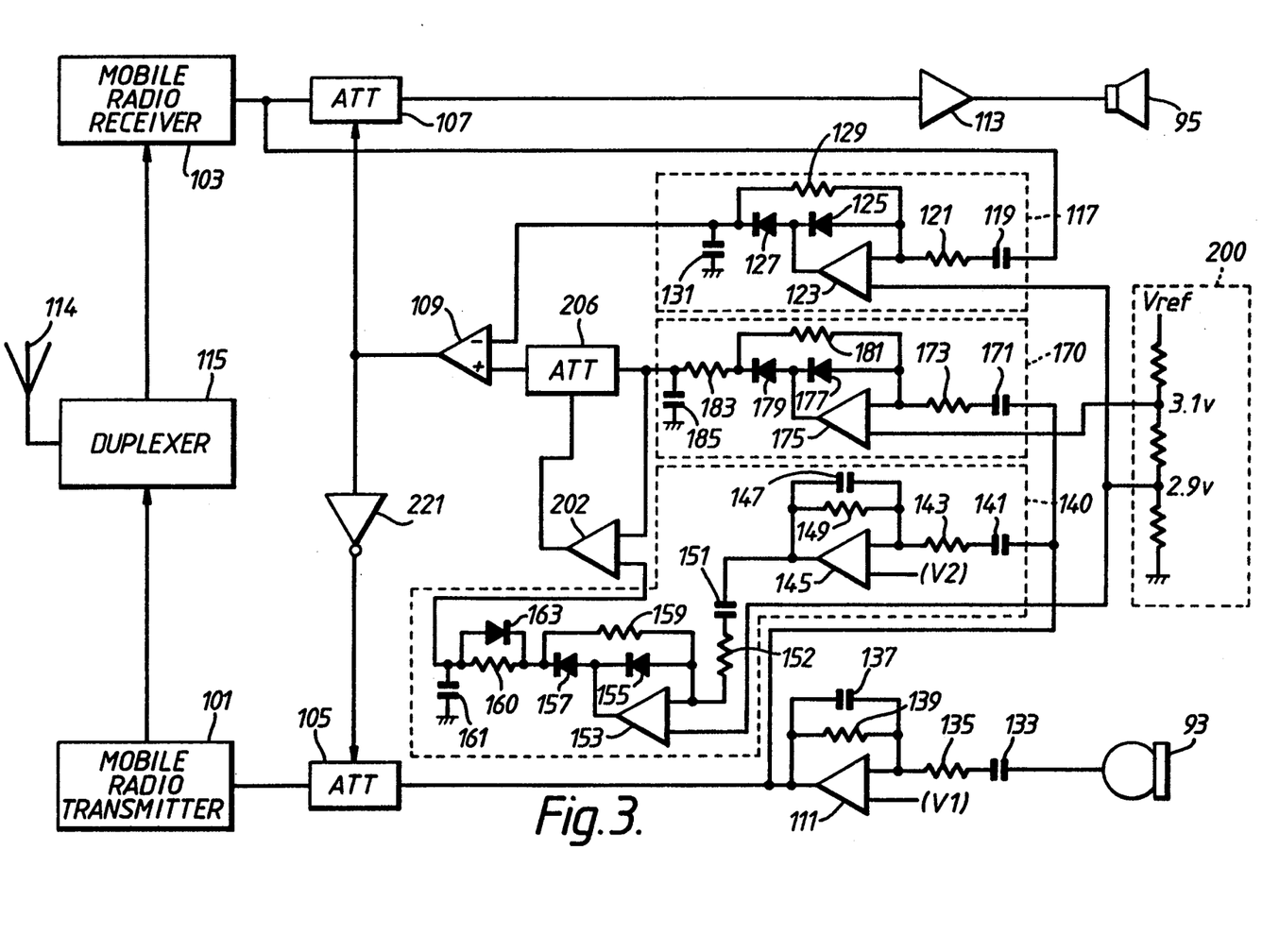
FIG. 3 is a block diagram of an embodiment of the hands-free circuitry of the present invention.

Referring to FIG. 3, there is illustrated a block diagram of a hands-free control circuit of the present invention. The control circuit interfaces a microphone 93 and a speaker 95 to a mobile radio transmitter 101 and a mobile radio receiver 103, respectively.

A path from the microphone 93 to a mobile radio transmitter 101 is defined as a microphone audio path. A path from a mobile radio receiver 103 to the speaker 95 is defined as a speaker audio path. In the microphone audio path, an amplifier 111 and an attenuator 105 are provided. In the speaker audio path, an attenuator 107 and an amplifier 113 are provided.

An audio signal from the attenuator 105 is applied to the mobile radio transmitter 101. The mobile radio transmitter 101 modulates the audio signal into a radio signal. A radio signal transmitted from the base station is received by an antenna 114 and the mobile radio receiver 103. The mobile radio receiver 103 demodulates the received radio signal into a receive audio signal. The receive audio signal is applied to the attenuator 107 and a receive audio signal level detector 117.

The receive audio signal level detector 117 includes a capacitor 119 and a resistor 121 which constitute a high-pass filter having a cut-off frequency of 221 Hz. The high-pass filter is coupled to one input of an operational amplifier 123. The other input of the operational amplifier 123 is coupled to a predetermined voltage (2.9 V) from an offset voltage circuit 200.

The operational amplifier 123 is connected to a feedback loop comprising a parallel combination of a diode 125 and both a diode 127 and a resisitor 129. The detector 117 further includes a capacitor 131 coupled to the diode 127 and the resistor 129. The capacitor 131 is coupled to ground. The diode 125 rectifies an amplified audio signal from the amplifier 123. When the diode 125 provides a rectified output, the capacitor 131 is charged. When the level of the receive audio signal decreases, the capacitor 131 is discharged.

The capacitor 131 is further coupled to a comparator 109. A voltage of the capacitor 131 is the level of the receive audio signal.

In the microphone audio path, a capacitor 133 and a resistor 135 are interposed between the microphone 93 and the operational amplifier 111. The capacitor 133 (0.1 $\mu F$) and the resistor 135 (15 K$\Omega$) constitute a high-pass filter having a cut-off frequency of 106 Hz. One input of the operational amplifier 111 is coupled to the resistor 135. The other input of the operational amplifier 111 is supplied with predetermined voltage (V1). The amplifier 111 has a parallel combination of a capacitor 137 and a resistor 139 in its feedback loop. The capacitor 137 (220 pF) and the resistor 139 (220 K$\Omega$) constitute a low pass filter having a cut-off frequency of 3.3 KHz.

The output signal from the operational amplifier 111 is applied to a capacitor 141 in a transmit noise level detector 140, a capacitor 171 in a transmit voice level detector 170 and the attenuater 105.

The capacitor 141 is coupled to a resistor 143. The resistor 143 is coupled to one input of an operational amplifier 145. The other input of the operational amplifier 145 is supplied with predetermined voltage (V2).

The operational amplifier 145 has a parallel combination of a capacitor 147 and a resistor 149 in its feedback loop. The capacitor 141 (1 $\mu F$) and resistor 143 (2.2 K$\Omega$) constitute a high-pass filter having a cut-off frequency of 72 Hz. The capacitor 147 (1500 pF) and the resistor 149 (220 K$\Omega$) constitute a low-pass filter having a cut-off frequency of 482 Hz. The low-pass filter is provided so as to extract a transmit noise signal out of a transmit audio signal.

The output of the operational amplifier 145 is coupled to a capacitor 151 which removes direct current from the output of the operational amplifier 145. The capacitor 151 is coupled to a resistor 152. The resistor 152 is coupled to one input of an operational amplifier 153. A predetermined voltage (2.9 V) from an offset voltage circuitry 200 is supplied to the other input of the operational amplifier 153. The operational amplifier 153 has a parallel combination of a diode 155 and both a diode 157 and a resistor 159 in its feedback loop. The diode 155 rectifies the ouput signal from the operational amplifier 153. The resistors 152, 159 and the operational amplifier 153 amplify the output signal from the operational amplifier 145. The diode 157 is coupled to a resistor 160. The resistor 160 is coupled to a capacitor 161 which is further coupled to ground. A diode 163 bypasses the resistor 160 in a direction from the capacitor 161 to the resistor 159. The diodes 157 and 163 are connected in opposition to each other.

When the diode 155 provides a rectified output signal, the capacitor 161 is charged. A time constant for charging the capacitor 161 is determined by values of the resistor 160 (470 K$\Omega$) and the capacitor 161 (4.7 $\mu F$). The time constant for charging the capacitor 161 may be defined as a rise time and is therefore 2.2 s.

When the level of the noise signal from the diode 157 decreases, the capacitor 161 is discharged. The charge from the capacitor 161 passes through the diode 163, the resistor 159, the diode 155 and the operational amplifier 153. A time constant for discharging the capacitor 161 is determined by the capacitor 161 (4.7 μF) and the resistor 159 (6.8 KΩ). The time constant for discharging the capacitor 161 is defined as a fall time and is 0.03 S. Therefore the time constant for charging the capacitor 161 (the rise time of 2.2 s) is much greater than the time constant for discharging the capacitor 161 (the fall time of 0.03 S). That is, a speed for charging the capacitor 161 is lower than a speed for discharging the capacitor 161. As a result, the capacitor 161 is slowly charged when the level of the noise signal increases. The capacitor 161 is immediately discharged when the level of the noise signal decreases. This circuitry causes the output level of the transmit noise level detector 140 to decrease immediately after the window of the vehicle is shut and the noise in the vehicle is substantially eliminated. The capacitor 161 is further coupled to one input of a comparator 202. The voltage of the capacitor 161 is the level of the transmit noise signal.

The output signal from the operational amplifier 111 is coupled to the capacitor 171 in the transmit voice level detector 170. The capacitor 171 (0.1 μF) and a resistor 173 (3.3 KΩ) constitute a high-pass filter having a cut-off frequency of 482 Hz. The resistor 173 is coupled to one input of an operational amplifier 175. A predetermined voltage (3.1 V) from the offset voltage circuitry 200 is supplied to the other input of the operational amplifier 175. The operational amplifier 175 has a parallel combination of a diode 177 and both a diode 179 and a resistor 181 in its feedback loop. The diode 177 rectifies the output signal of the operational amplifier 175. The operational amplifier 175 amplifies a transmit voice signal from the high-pass filter (the capacitor 171 and the resistor 173). The output of the diode 179 is coupled to a delay circuitry including a resistor 183 (470 KΩ) and a capacitor 185 (0.47 μF). A time constant for charging the capacitor 183 is determined by values of the resistor 183 and the capacitor 185 and is therfore 0.22 S. When the level of the transmit voice signal decreases, the capacitor 185 is discharged. A time constant for discharging the capacitor 185 is determined by values of the capacitor 185 (0.47 μF) and resistors 183 (470 KΩ) and 181 (220 KΩ) and is therefore 0.32 S.

The output level from the capacitor 185 is coupled to the comparator 202. In the comparator 202, the level of the transmit voice signal from the transmit voice level detector 170 and the level of transmit noise signal from the transmit noise level detector 140 are compared. When the level of transmit noise signal is higher than the level of the transmit voice signal, the comparator 202 provides a control signal 204 having a binary one state. The control signal 204 is applied to an attenuator 206.

Figure 4:
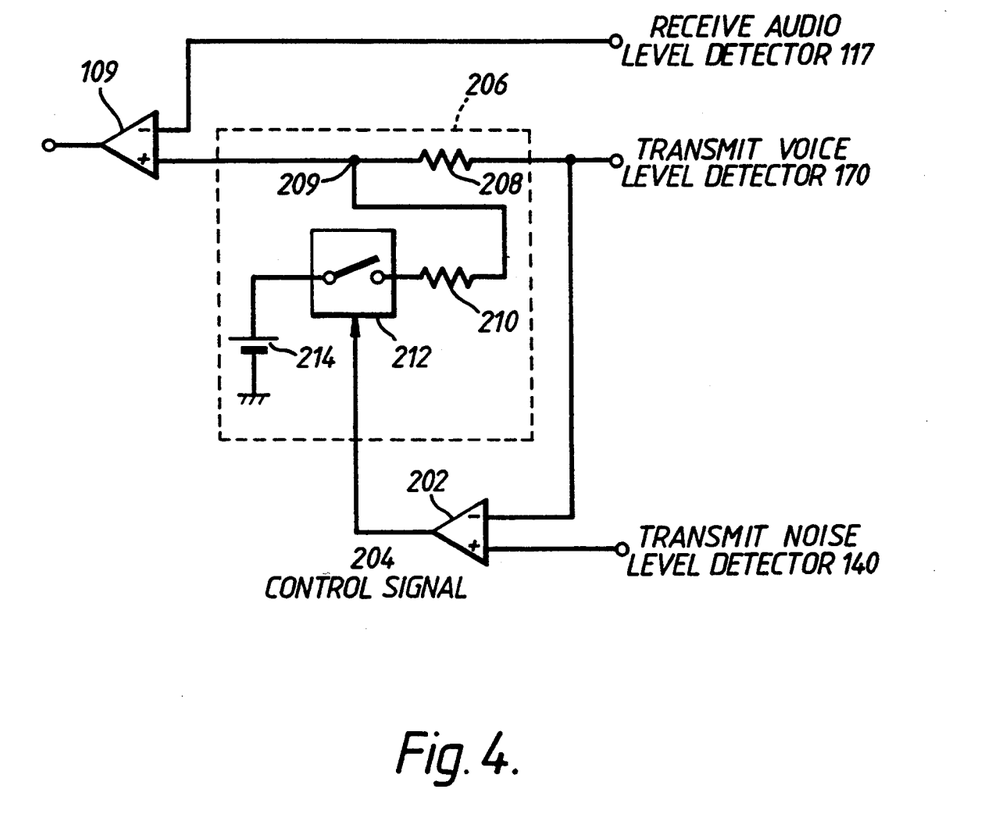
FIG. 4 is a detailed circuit diagram of the attenuator 206 in FIG. 3.

Referring to FIG. 4, there is illustrated a block diagram of a configuration of the attenuator 206 in FIG. 3. The transmit voice level detector 170 is coupled to the comparator 202 and a resistor 208. The resistor 208 is coupled to one input of the operational amplifier 109 and a resistor 210. The resistor 210 is coupled to a switch 212 which is activated in response to a control signal 204. The switch 212 is coupled to a battery 214.

When the control signal 204 is a binary one state, the switch 212 connects the resistor 210 to the battery 214. In this state, the voltage of a divided point 209 is determined by values of the resistors 208, 210 because the input impedance of the comparator 109 is high impedance.

When the control signal 204 is a binary zero state, the switch 212 disconnects the resistor 210 from the battery 214. Therefore the voltage of the divided point 209 is determined by value of the resistor 208.

Therefore the voltage of the divided point 209 appearing when the control signal 204 is the binary one state is lower than that appearing when the control signal 204 is the binary zero state. That is, when the level of the transmit noise signal is higher than the level of the transmit voice signal, the attenuator 206 is activated in response to the control signal 204 for decreasing the level of the transmit voice signal.

The output level of the attenuator 206 and the output level of the receive audio level detector 117 are compared in the comparator 109. When the output voltage of the attenuator 206 is higher than the level of the receive audio signal, the comparator 109 provides a binary one state. This signal having the binary one state causes the attenuator 107 to attenuate the receive signal from the radio receiver 103. In this state, the signal via an inverting gate 221 causes the attenuator 105 not to attenuate the receive audio signal. This mode is called a transmit-mode.

When the output level of the receive audio signal detector 117 is higher than the output level of the attenuator 206, the comparator provides a binary zero state for activating the attenuator 105. The attenuator 105 attenuates the transmit audio signal from the operational amplifier 111. The attenuator 107 is not activated due to the zero state of the output of the comparator 109. This mode is called a receive-mode.

Figure 5:
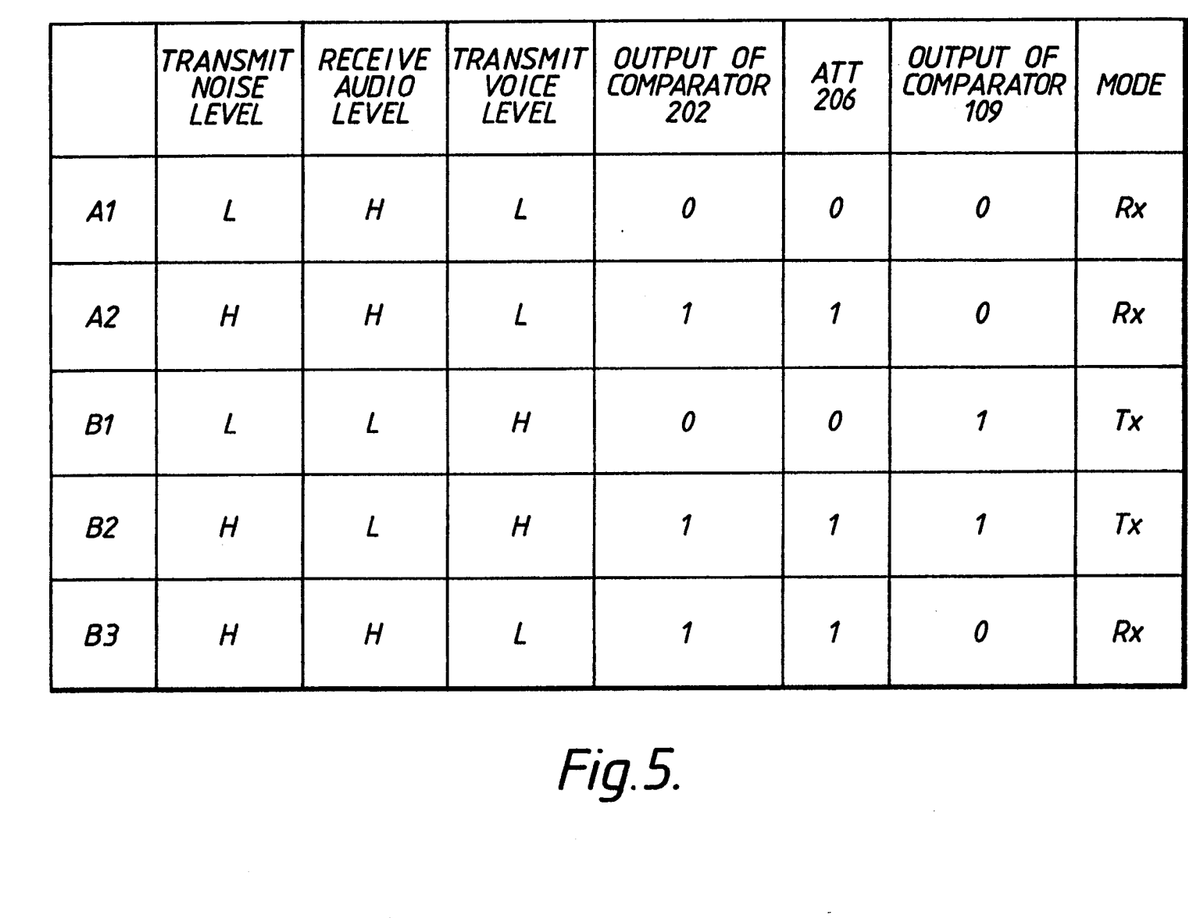
FIG. 5 is a table for explaining operations of the hands-free circuitry in FIG. 3.

Referring to FIG. 5, there is illustrated a table showing five states in the preferred embodiment. In this table, the level of the transmit noise signal is defined as a transmit noise level. The level of the transmit voice signal is defined as a transmit voice level. The level of the receive audio signal is defined as a receive audio level. In a state A1, when the transmit noise level is low, the transmit voice level is low, and the receive audio level is high, the transmit noise level is lower than the transmit voice level, since the voltage to the operational amplifier 153 (2.9 V) from the offset voltage circuitry 200 is lower than the voltage to the operational amplifier 175 (3.1 V). The comparator 202 provides a zero state of the control signal 204. That is, the transmit voice level is not attenuated and provided to the one input of the comparator 109. On the contrary, to the other input of the comparator 109, the receive audio level having high magnitude is provided. Therefore the receive audio level is higher than the transmit voice level. This mode is a receive-mode.

When, in the above state A1, a large magnitude of noise is provided to the microphone 93 (a state A2 in FIG. 5), the transmit noise level is higher than the transmit voice level. The output of the comparator 202 becomes the binary one state which activates the attenuator 206 for attenuating the transmit voice level. That is, the attenuated transmit voice level is provided to the one input of the comparator 109. The other input of the comparator 109 is provided with the receive audio level having high magnitude. As a result, the receive audio level is higher than the attenuated transmit voice level. Therefore the comparator 109 provides a zero state and the receive mode is maintained even if the long noise temporarily occurs. That is, the difficulty in listening to another user's speech in the conventional hands-free circuitry because of changing from the receive mode to the transmit mode in noisy environment is avoided.

Next, assume the state B1 wherein the transmit noise level is low, the receive audio level is low, and the transmit voice level is high. The transmit voice level is higher than the transmit noise level. Therefore the comparator 202 provides a zero state for causing the attenuator 206 not to be activated. That is, the transmit voice level is not attenuated and provided to one input of the comparator 109. The other input of the comparator 109 is provided with the receive audio level having low magnitude. As a result, the transmit voice level is higher than the receive audio level. Therefore the comparator 109 provides a binary one state. In this state, the mode is the transmit-mode.

When, in the state B1, a high level of noise occurs in the vehicle (the state B2 in FIG. 5) and the transmit noise level is higher than the transmit voice level, the comparator 202 provides a binary one state. As a result, the transmit voice level is attenuated. An attenuated transmit voice level is provided to one input of the comparator 109. The value for attenuating the transmit voice level is determined so that the attenuated level is not less than 3.1 V. On the contrary, the receive audio level is 2.9 V. Therefore the attenuated transmit voice level is higher than the receive audio level. That is, the comparator 109 provides a binary one state for maintaining the transmit-mode.

Assume the state B3 wherein the operator ceases to speak in noisy environment and another user starts conversation. When the transmit noise level is higher than the transmit voice level, the comparator 202 provides a binary one state. As a result, the attenuator 206 is activated and the transmit voice level is attenuated in response to the binary one state of the comparator 202 output. Therefore the comparator 109 compares the attenuated transmit voice level to the the receive audio level having high magnitude and provides a binary zero state (the receive-mode). That is, if the operator ceases to speak a noisy environment and another user starts conversation, the mode is smoothly changed from the transmit mode (the state B2) to the receive mode (the state B3). Therefore the difficulty in the conventional circuitry that the mode is not smoothly changed in noisy environment is avoided.

Figure 6:
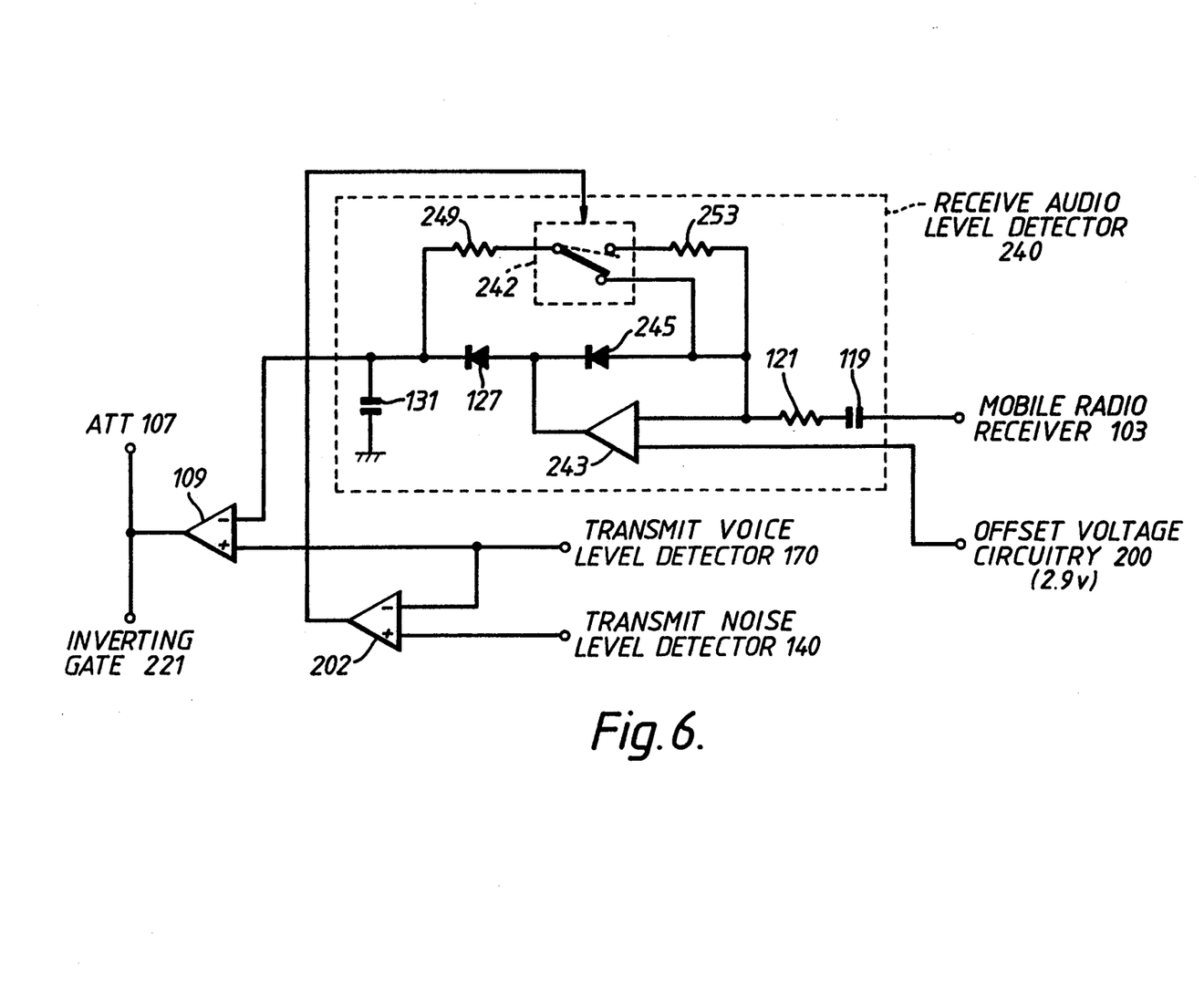
FIG. 6 is a block diagram of another embodiment of the present invention.

Referring to FIG. 6, there is illustrated another embodiment of the present invention. A receive audio signal level detector 240 is different from the receive audio signal detector 117 in FIG. 3. The comparator 202, which compares the transmit noise level to the transmit voice level, provides an output to a switch 242 in the receive audio signal level detector 240. If the output of the comparator 202 is a binary zero state, the switch 242 maintains a state connecting a resistor 249 to a diode 245 as shown by a solid line. If the output of the comparator 202 is a binary one state, the switch 242 connects the resistor 249 to a resistor 253 as shown by a dot line. The gain of operational amplifier 243 appearing when the control signal of the comparator 202 is a binary one state is higher than that appearing when the control signal is a binary zero state. That is, when the comparator 202 provides a binary one state (noisy state), the gain of the receive audio level detector 240 is made higher.

Figure 7:
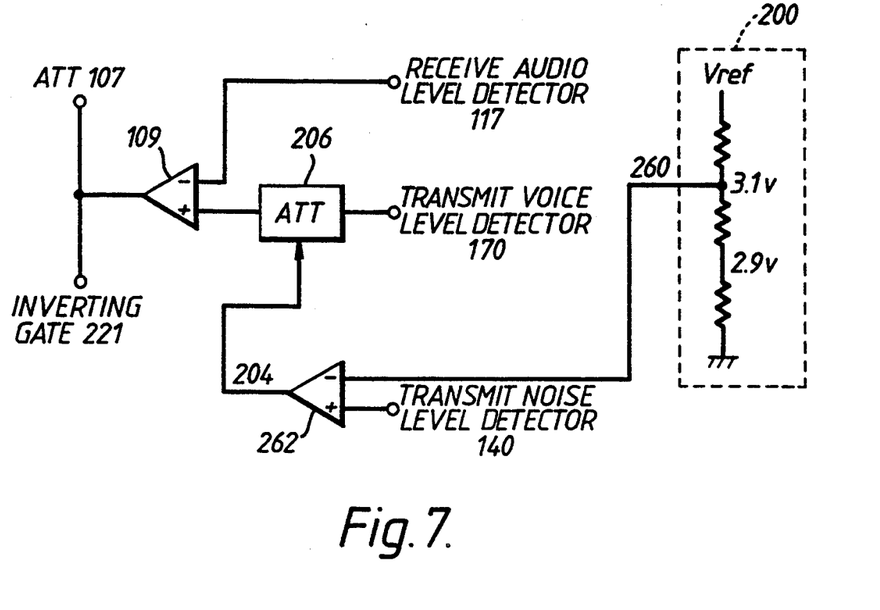
FIG. 7 is a block diagram of yet another embodiment of the present invention.

Referring to FIG. 7 there is illustrated yet another embodiment of the present invention. In the comparator 262, the transmit noise level is compared with the predetermined voltage 260 (3.1 V) from the offset voltage circuitry 200. If the transmit noise level is higher than 3.1 V, the comparator 262 provides a binary one state in its output 204. In response to the output control signal 204, the attenuator 206 is activated.

In this embodiment, since the transmit noise level is compared to the predetermined voltage from the offset voltage circuitry 200, a high-pass filter comprising the capacitor 171 and the resistor 173 for extracting the transmit voice signal need not be provided.

Figure 8:
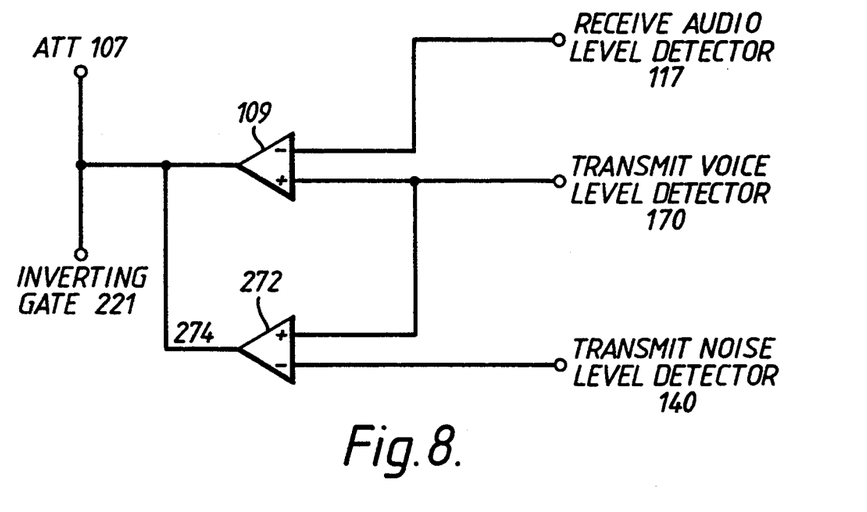
FIG. 8 is a block diagram of yet further another embodiment of the present invention.

Referring to FIG. 8, there is illustrated yet another embodiment of the present invention. If the transmit noise level is higher than the transmit voice level, a comparator 272 provides a binary zero state in its output 274. The output 274 of the comparator 272 is coupled to the output of the comparator 109. If the noisy state is detected in the comparator 272, the comparator 272 enforces the output of the comparator 109 to be a binary zero state (the receive-mode).

As mentioned above, referring to FIG. 5, when the land party ceases to speak, the operator starts conversation and noise starts occuring in the vehicle (from the state A1 to the state A2 in FIG. 5), the receive-mode is maintained. Therefore the problem in the conventional circuitry, wherein the operator has difficulty in listening the audio from the speaker due to the mode changing from the receive-mode to the transmit-mode, (clipping of speech) is avoided.

Furthermore, referring to FIG. 5, when the operator ceases to speak in the noisy environment and the land party starts conversation (from the B2 state to the B3 state in FIG. 5), the mode is smoothly changed from the transmit-mode to the receive-mode. Therefore the problem in the art, that the mode is unchanged, is avoided.

Further, in these embodiments, the circuitry detects noisy state by extracting the transmit noise signal out of the transmit audio signal on the microphone audio path. Therefore it is unnecessary to provide another microphone only for detecting the noisy state.

What is claimed is:

1. A hands-free circuit for controlling the application of a receive audio signal from a communication path to a signal reproducing means and the application of a transmit audio signal from an audio signal source to the communication path, comprising:

receive audio level detecting means for detecting a receive audio level of the receive audio signal;

transmit noise level detecting means for extracting a transmit noise signal out of the transmit audio signal and for detecting a transmit noise level of the transmit noise signal;

transmit voice level detecting means for extracting a transmit voice signal out of the transmit audio signal and for detecting a transmit voice level of the transmit voice signal;

first comparing means for comparing the transmit noise level with the transmit voice level and for generating an output signal having a first predetermined state when the transmit noise level is higher than the transmit voice level and having a second predetermined state when the transmit voice level is higher than the transmit noise level;

first attenuating means for attenuating the transmit voice level and for generating an attenuated transmit voice level as an output level in response to the first predetermined state of the first comparing means output signal and for generating the transmit voice level as an output level in response to the second predetermined state of the first comparing means output signal;

second comparing means for comparing the output level of the first attenuating means with the receive audio level and for generating an output signal having a first predetermined state when the output level of the first attenuating means is higher than the receive audio level and having a second predetermined state when the receive audio level is higher than the output level of the first attenuating means;

second attenuating means for attenuating the receive audio signal applied to the signal reproducing means in response to the first predetermined state of the second comparing means output signal; and third attenuating means for attenuating the transmit audio signal applied to the communication path in response to the second predetermined state of the second comparing means output signal.

2. A hands-free circuit according to claim 1 wherein the transmit noise level detecting means further includes filtering means for filtering the transmit audio signal.

3. A hands-free circuit according to claim 2 wherein the filtering means is a low-pass filter.

4. A hands-free circuit according to claim 1 wherein the transmit noise level detecting means further includes rectifying means for rectifying the transmit noise signal.

5. A hands-free circuit according to claim 4 wherein the transmit noise level detecting means further includes time delay means for raising an output level of the noise level detecting means to an output level of the rectifying means in accordance with a rise time constant and for decreasing the output level of the transmit noise level detecting means to the output level of the rectifying means in accordance with a fall time constant, the rise time constant being longer than the fall time constant.

6. A hands-free circuit according to claim 5 wherein the rise time constant is at least two (2) seconds.

7. A hands-free circuit according to claim 1, further including bias applying means for applying a first bias to the transmit noise level detecting means and the receive audio level detecting means and for applying a second bias to the transmit voice detecting means, the second bias being greater than the first bias.

8. A hands-free circuit according to claim 1 wherein the transmit voice level detecting means further includes filtering means for filtering the transmit audio signal.

9. A hands-free circuit according to claim 8 wherein the filtering means is a high-pass filter.

10. A hands-free circuit according to claim 1 wherein the transmit voice level detecting means further includes first rectifying means for rectifying the transmit voice signal and first time delay means for raising an output level of the transmit voice level detecting means to an output level of the first rectifying means in accordance with a first rise time constant and wherein the transmit noise level detecting means includes second rectifying means for rectifying the transmit noise signal and a second time delay means for raising the output level of the transmit noise level detecting means to an output level of the second rectifying means in accordance with a second rise time constant, the second rise time constant being greater than the first rise time constant.

11. A hands-free circuit for controlling the application of a receive audio signal from a communication path to a signal reproducing means and the application of a transmit audio signal from an audio signal source to the communication path, comprising:

receive audio level detecting means for detecting a receive audio level of the receive audio signal;

transmit noise level detecting means for extracting a transmit noise signal out of the transmit audio signal and for detecting a transmit noise level of the transmit noise signal;

transmit voice level detecting means for extracting a transmit voice signal out of the transmit audio signal and for detecting a transmit voice level of the transmit voice signal;

first comparing means for comparing the transmit noise level with the transmit voice level and for generating an output signal having a first predetermined state when the transmit noise level is higher than the transmit voice level and having a second predetermined state when the transmit voice level is higher than the transmit noise level;

amplifying means for amplifying the receive audio level and for generating an amplified receive audio level as an output level in response to the first predetermined state of the first comparing means output signal and for generating the receive audio level as an output level in response to the second predetermined state of the first comparing means output signal;

second comparing means for comparing the transmit voice level with the output level of the amplifying means and for generating an output signal having a first predetermined state when the transmit voice level is higher than the output level of the amplifying means and having a second predetermined state when the output level of the amplifying means is higher than the transmit voice level;

first attenuating means for attenuating the receive audio signal to the signal reproducing means in response to the first predetermined state of the second comparing means output signal; and second attenuating means for attenuating the transmit audio signal to the communication path in response to the second predetermined state of the second comparing means output signal.

12. A hands-free circuit for controlling the application of a receive audio signal from a communication path to a signal reproducing means and the application of a transmit audio signal from an audio signal source to the communication path, comprising:

transmit noise level detecting means for extracting a transmit noise signal out of the transmit audio signal and for detecting a transmit noise level of the transmit noise signal;

transmit voice level detecting means for extracting a transmit voice signal out of the transmit audio signal and for detecting a transmit voice level of the transmit voice signal;

first comparing means for comparing the transmit noise level with the transmit voice level and for generating an output signal having a first predetermined state when the transmit noise level is higher than the transmit voice level and having a second predetermined state when the transmit voice level is higher than the transmit noise level;

receive audio level detecting means for amplifying the receive audio signal by a first amplification factor in response to the first predetermined state of the first comparing means output signal and by a second amplification factor less than the first amplification factor in response to the second predetermined state of the first comparing means output signal and means for detecting a receive audio level of an amplified receive audio signal;

second comparing means for comparing the transmit voice level with the receive audio level output by the receive audio level detecting means and for generating an output signal having a first predetermined state when the transmit voice level is higher than the receive audio level output by the receive audio level detecting means and having a second predetermined state when the receive audio level output by the receive audio level detecting means is higher than the transmit voice level;

first attenuating means for attenuating the receive audio signal to the signal reproducing means in response to the first predetermined state of the second comparing means output signal; and second attenuating means for attenuating the transmit audio signal to the communication path in response to the second predetermined state of the second comparing means output signal.

13. A hands-free circuit according to claim 12 wherein the means for amplifying further includes an operational amplifier and coupling means for coupling the operational amplifier to a first feedback impedance in response to the first predetermined state of the first comparing means output signal and for coupling the operational amplifier to a second feedback impedance less than the first feedback impedance in response to the second predetermined state of the first comparing means output signal.

14. A hands-free circuit for controlling the application of a receive audio signal from a communication path to a signal reproducing means and the application of a transmit audio signal from an audio signal source to the communication path, comprising:

receive audio level detecting means for detecting a receive audio level of the receive audio signal;

transmit noise level detecting means for extracting a transmit noise signal out of the transmit audio signal and for detecting a transmit noise level of the transmit noise signal;

transmit voice level detecting means for extracting a transmit voice signal out of the transmit audio signal and for detecting a transmit voice level of the transmit voice signal;

first comparing means for comparing the transmit noise level with the transmit voice level and for generating an output signal having a predetermined state when the transmit noise level is higher than the transmit voice level;

second comparing means for comparing the transmit voice level with the receive audio level and for generating an output signal in response to the predetermined state of the first comparing means output signal; and controlling means, responsive to the output signal of the second comparing means, for controlling the receive audio signal and the transmit audio signal.

15. A hands-free circuit for controlling the application of a receive audio signal from a communication path to a signal reproducing means and the application of a transmit audio signal from an audio signal source to the communication path, comprising:

receive audio level detecting means for detecting a receive audio level of the receive audio signal;

transmit noise level detecting means for extracting a transmit noise signal out of the transmit audio signal and for detecting a transmit noise level of the transmit noise signal;

transmit audio level detecting means for detecting a transmit audio level of the transmit audio signal;

first comparing means for comparing the transmit noise level with a reference signal and for generating an output signal having a first predetermined state when the transmit noise level is higher than the reference signal and having a second predetermined state when the reference signal is higher than the transmit noise level;

first attenuating means for attenuating the transmit audio level and for generating the attenuated transmit audio level as an output level in response to the first predetermined state of the first comparing means output signal and for generating the transmit audio level as an output level in response to the second predetermined state of the first comparing means output signal;

second comparing means for comparing the output level of the first attenuating means with the receive audio level and for generating an output signal having a first predetermined state when the output level of the first attenuating means is higher than the receive audio level and having a second predetermined state when the receive audio level is higher than the output level of the first attenuating means;

second attenuating means for attenuating the receive audio signal to the signal reproducing means in response to the first predetermined state of the second comparing means output signal; and third attenuating means for attenuating the transmit audio signal to the communication path in response to the second predetermined state of the second comparing means output signal.

16. A hands-free circuit according to claim 15 wherein the reference signal has a predetermined level.

17. A hands-free circuit for controlling the application of a receive audio signal from a communication path to a signal reproducing means and the application of a transmit audio signal from an audio signal source to the communication path, comprising:

receive audio level detecting means for detecting a receive audio level of the receive audio signal;

transmit noise level detecting means for extracting a transmit noise signal out of the transmit audio signal, for detecting a transmit noise level of the transmit noise signal, and for detecting a noisy state when the transmit noise level is higher than a reference level;

adjusting means for adjusting the bias voltage of the receive audio level detecting means, thereby altering the receive audio level when the noisy state is detected by the transmit noise detecting means; and controlling means, responsive to the adjusting means, for controlling the receive audio signal and the transmit audio signal.

18. A hands-free circuit for controlling the application of received audio signals from a communication path to a signal reproducing apparatus and the application of transmit audio signals from an audio signal source to the communication path, comprising:

receive audio level detecting means for detecting a receive audio level of the received audio signals;

transmit noise level detecting means for extracting transmit noise signals out of the transmit audio signals and for detecting a transmit noise level of the transmit noise signals;

transmit voice level detecting means for extracting transmit voice signals out of the transmit audio signals and for detecting a transmit voice level of the transmit voice signals;

comparing means for comparing the receive audio level, the transmit noise level, and the transmit voice level, and for outputting a signal when the receive audio level is more than a first predetermined level, the transmit noise level is more than a second predetermined level, and the transmit voice level is less than a third predetermined level; and attenuating means for attenuating the transmit audio signals to the communication path in response to the signal outputted from the comparing means.

* * * * *